(12) United States Patent
De France et al.

(10) Patent No.: US 11,873,101 B2
(45) Date of Patent: Jan. 16, 2024

(54) DEVICE FOR SECURING AT LEAST ONE SLING FOR TRANSPORTING A LOAD

(71) Applicant: ESCAPE INTERNATIONAL SAS, Paris (FR)

(72) Inventors: Yves De France, Ville d'Avray (FR); Gary Bertrand, Le Pre Saint Gervais (FR); Eric Lamotte, Paris (FR)

(73) Assignee: ESCAPE INTERNATIONAL SAS, Paris (FR)

( * ) Notice: Subject to any disclaimer, the term of this patent is extended or adjusted under 35 U.S.C. 154(b) by 1062 days.

(21) Appl. No.: 16/624,607

(22) PCT Filed: Jun. 11, 2018

(86) PCT No.: PCT/EP2018/065382
§ 371 (c)(1),
(2) Date: Dec. 19, 2019

(87) PCT Pub. No.: WO2019/001941
PCT Pub. Date: Jan. 3, 2019

(65) Prior Publication Data
US 2020/0262558 A1 Aug. 20, 2020

(30) Foreign Application Priority Data
Jun. 28, 2017 (FR) ...................................... 1755971

(51) Int. Cl.
*B64D 1/22* (2006.01)
*B64C 27/04* (2006.01)
*B66C 1/12* (2006.01)

(52) U.S. Cl.
CPC ................ *B64D 1/22* (2013.01); *B64C 27/04* (2013.01); *B66C 1/12* (2013.01)

(58) Field of Classification Search
CPC ........ B64D 1/22; B64D 17/30; B64D 17/383; B64D 1/08; B64C 27/04; B66C 1/12
See application file for complete search history.

(56) References Cited

U.S. PATENT DOCUMENTS

| 2,953,330 A | 9/1960 | Lysak |
| 4,337,913 A | 7/1982 | Booth |
(Continued)

FOREIGN PATENT DOCUMENTS

| GB | 2267121 A | 11/1993 |
| JP | 2008168823 A | * 7/2008 |

OTHER PUBLICATIONS

Search Report from French Intellectual Property Office on corresponding FR application (FR1755971) dated Mar. 9, 2018.
(Continued)

*Primary Examiner* — Stephen A Vu
(74) *Attorney, Agent, or Firm* — KOS IP Law LLP

(57) ABSTRACT

A device for securing at least one sling for transporting a load under a helicopter, the securing device comprising at least a first strap and at least a second strap, a connection mechanism configured, in the closed state, to connect the straps, to form a comprehensive security strap capable of supporting a sling and, in the open state, to release the straps for releasing the sling, and an actuator configured to open the connection mechanism following a mechanical effort being introduced, the connection mechanism comprising cascading reduction means configured to reduce the resistance force during the opening of the connection mechanism generated by the load connected to the sling.

18 Claims, 5 Drawing Sheets

(56) References Cited

U.S. PATENT DOCUMENTS

| | | | | |
|---|---|---|---|---|
| 8,870,123 | B2* | 10/2014 | Deazley | B64D 17/62 244/149 |
| 9,242,736 | B2* | 1/2016 | Fitzgerald | B64D 17/32 |
| 9,586,688 | B2* | 3/2017 | Blignaut | B64D 17/30 |
| 9,676,487 | B1* | 6/2017 | Fox, Jr. | B64D 17/38 |
| 10,604,256 | B2* | 3/2020 | Gad | B64D 17/62 |

OTHER PUBLICATIONS

International Search Report and Written Opinion on corresponding PCT application (PCT/EP2018/065382) from International Searching Authority (EPO) dated Jul. 23, 2018.

* cited by examiner

DEVICE FOR SECURING AT LEAST ONE SLING FOR TRANSPORTING A LOAD

TECHNICAL FIELD

The present invention relates to the field of transport by helicopter under slings and, more specifically, a device for securing a sling for transporting a load.

BACKGROUND

Today, it is known to transport material, also designated a "load", with a helicopter. When the volume of the load is too great to be transported inside the helicopter, it is known to connect the load under the helicopter using a cable, known by the term "sling", in order to lift the load to transport it. With this aim, with reference to FIG. 1, a helicopter 1A comprises a fastening device, called load hook 2A, to which is connected the upper end of a sling E, a load C being connected to the lower end of the sling E. The hook 2A comprises an opening device 3A suited to being actuated, in an electrical or mechanical manner, by an operator situated in the helicopter 1A. The opening of the hook 2A releases the upper end of the sling E. In other words, the sling E is dropped with the load C in an emergency, or once the load C has been deposited at the end of an operation. In practice, a risk exists that the hook 2A opens accidentally and releases the sling E without its opening device 3A having been actuated voluntarily by an operator. The load C is then released at a high altitude, which can cause damage.

Today, there exists a need to transport persons under slings. The risk of accidental opening of the hook must then be eliminated.

One solution would be to make the opening system redundant by providing two similar hooks each equipped with an independent opening device. During the transport of a load, the sling is hung from the helicopter by the two hooks and the operator must perform two independent operations to open the hooks. Although this solution makes it possible to reduce the risk of accidental loss of the load, it has drawbacks. Indeed, making the opening system redundant increases the number of elements which are bulky, heavy, complex and costly to install in a helicopter. In addition, it is not easy to install a second hook and its opening device in an existing helicopter, notably due to certification constraints.

There thus exists a need for a device making it possible to secure a sling in order to eliminate the risk of accidental dropping while being able to be installed in existing helicopters. It is also necessary for operational reasons to be able to release the load manually when it is retained by the securing device.

In another technical field different to that of the dropping of loads, it is known from the patent application GB2267121 to support an operator from a sling suspended from a hook of a helicopter. The suspension is secured by a strap.

In another technical field different to that of the dropping of loads, a parachute opening system comprising loops is known from the patent application U.S. Pat. No. 4,337,913.

SUMMARY OF THE INVENTION

To this end, the invention relates to a device for securing at least one sling for transporting a load under a helicopter, said securing device comprising:

at least one first strap and at least one second strap, each strap extending longitudinally and comprising an end for joining to the helicopter and a connecting end, a connecting mechanism configured, in a closed state, to connect the connecting ends of the straps to form an overall securing strap capable of supporting a sling and, in an open state, to release the connecting ends of the straps to drop the sling, the connecting mechanism being suited to withstand in the closed state a tractive force of 1500 kg, and an actuator configured to open the connecting mechanism further to an input of mechanical force, the connecting mechanism comprising cascade reduction means configured to reduce the force resisting the opening of the connecting mechanism induced by the support of the sling so that the input mechanical force is less than 20 kg for a tractive force of 1500 kg induced by the support of the sling.

Thanks to the securing device, it is possible to eliminate the risk of accidental dropping of a load transported under a sling thanks to the fastening of the sling to the helicopter by the securing device. Such a securing device may be mounted in an added-on manner on an existing helicopter, which limits the cost of the gain in security. Such a securing strap makes it possible to make redundant the fastening of the sling in addition to a conventional fastening device. Thanks to its reduction connecting mechanism, the securing device may be opened in a practical manner and without it being arduous for an operator to drop a load. Thus, even in the event of malfunction of the fastening device, the load may be dropped in an optimal manner. The actuator makes it possible to release the load at a distance from the connecting mechanism.

For the sake of brevity, a tractive force of 1500 kg is taken to mean a tractive force of a load of 1500 kg supported by a sling.

Preferably, the connecting mechanism comprises a plurality of rings mounted in cascade in order to reduce the force resisting the opening of the connecting mechanism generated by the load connected to the sling.

Preferably, the connecting mechanism comprises at least a first ring, a second ring and a third ring, the first ring having a diameter greater than that of the second ring and the second ring having a diameter greater than that of the third ring, the first ring being hinged at the level of the connecting end of the first strap whereas the second and third rings are hinged at the level of the connecting end of the second strap.

Preferably, the second ring is arranged to block the first ring and the third ring is arranged to block the second ring. Preferably, the actuator is suited to blocking the third ring when the connecting mechanism is in the closed state.

Thus, the rings are mounted so as to enable an opening in cascade. The displacement of a ring of small dimensions making it possible to release rings of large dimensions. A ring of large dimensions makes it possible to support important mechanical forces whereas a ring of small dimensions may be displaced with a reduced force. Thus, the layout of the rings makes it possible to achieve a reduction in the force resisting the opening of the connecting mechanism generated by the load connected to the sling while opposing the incoming force.

According to an aspect of the invention, the reduction means comprise more than three rings so as to reduce the value of the force resisting the opening.

Preferably, the connecting mechanism is configured to reduce the force resisting the opening of the connecting mechanism generated by the load connected to the sling by a reduction factor greater than 70, preferably, greater than 100, for a tractive force, induced by the load, of the order of 1500 kg. Thus, a load of considerable mass may be dropped manually by a single operator and without risk thereto in the event of malfunction.

Preferably, the actuator is suited to receiving an input of mechanical tractive force by an operator. In other words, a manual mechanical force is sufficient to open the securing device due to the reduction means. A manual mechanical release is advantageous given that it may be realised in the event of failure of the electrical equipment. Moreover, on account of its manual opening, the securing device may be mounted in an existing helicopter without undergoing structural modification thus without new certification steps, which procures a significant time and financial saving.

Preferably, the connecting mechanism is configured to withstand a tractive force of 5000 kg, further preferably 6000 kg.

Preferably, the input mechanical force is greater than 1 kg to release a load of the order of 1500 kg. Unlike a reduction connecting mechanism existing in other technical fields only supporting light loads, the reduction connecting mechanism according to the invention is arranged to receive a force greater than 1 kg, preferably greater than 5 kg, further preferably of the order of 15 kg, to release a load of the order of 1500 kg. Such a force remains important but makes it possible to reduce the complexity of the reduction connecting mechanism.

According to an aspect of the invention, the ends for joining the straps (first strap and second strap) are connected together so as to form a loop which may be suspended from an organ of the helicopter, notably from the load hook.

According to another aspect of the invention, the securing device comprises a third strap suited to being connected to the ends for joining the first and the second strap so as to form a securing loop suited to being suspended from a part of the helicopter. Thus, when the first strap and the second strap cannot be connected directly to the structural chassis of a helicopter, a third strap may be added in order to form a suspension loop. Such a third strap is particularly advantageous for putting the securing device in place on an existing helicopter without affecting its structure.

The invention also relates to a helicopter comprising a structural chassis, a fastening device, fastened to the structural chassis, configured to support a sling and to release it in a controlled manner, and a securing device as described previously, of which the ends for joining the first and the second strap are fastened to said structural chassis for securing the support of the sling by the helicopter.

Thanks to the invention, an existing helicopter may be equipped with an added-on securing device which may moreover be opened in a practical manner in order to drop the load in an optimal manner. The security of the load is greatly improved.

The invention further relates to a method for securing a sling mounted under a helicopter as described previously, the method comprising:

a step of linking the fastening device to a sling, and
a step of linking the securing device to the sling so as to secure its support by the helicopter.

Such a securing method makes it possible to make up for a traditional fastening device for securing the load in the event of malfunction.

BRIEF DESCRIPTION OF THE DRAWINGS

The invention will be better understood on reading the description that follows, given purely as an example, and by referring to the appended drawings among which.

It should be noted that the figures illustrate the invention in a detailed manner for implementing the invention, said figures obviously being able to serve to better define the invention if need be.

DETAILED DESCRIPTION

Figure 1:
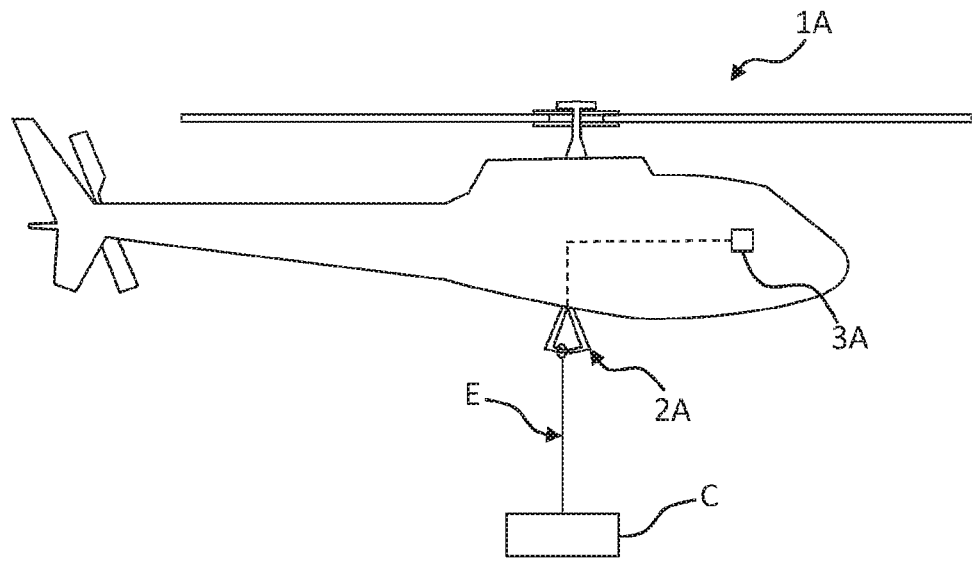
FIG. 1 is a schematic view of a helicopter according to the prior art.
Figure 2:
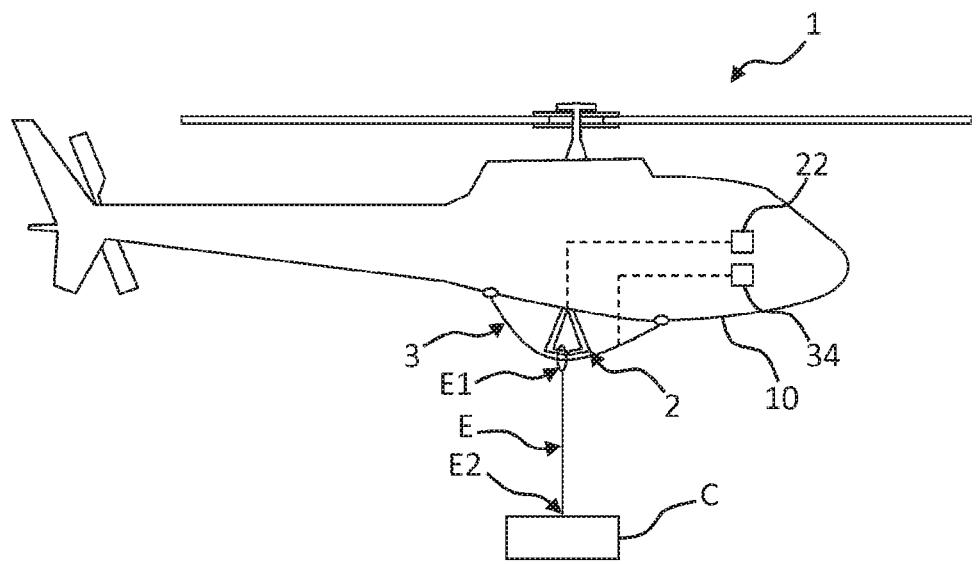
FIG. 2 is a schematic view of a helicopter according to the invention.

With reference to FIG. 2, a helicopter 1 according to the invention is represented which comprises a structural chassis 10 defining an inner cockpit from which an operator can pilot the helicopter 1. The helicopter 1 is suited to transporting a load C. In this example, the load C has a considerable volume and cannot be transported in the cockpit of the helicopter 1.

With this aim, the load C is suspended underneath the helicopter 1 by a sling E. The sling E extends longitudinally and has an upper end E1, connected to the helicopter, and a lower end E2, connected to the load C. The load C comprises a gripping point from which is hung the lower end E2 of the sling E. Preferably, the sling E comprises a loop at the level of its upper end E1 in order to enable its fastening to the helicopter 1. In this example, a load C connected to the helicopter 1 by a single sling E is described, but it goes without saying that it could be connected by more than one sling E.

In a known manner, with reference to FIG. 2, the helicopter 1 comprises a fastening device 2 configured to support a sling E and to release it in a controlled manner. Such a fastening device 2 is known to those skilled in the art notably under the designation of "load hook", "load shedding hook system", "cargo hook" or "clasp hook". In a known manner, the fastening device 2 is fastened onto the structural chassis 10 of the helicopter 1 so as to transmit to it the mechanical forces.

Figure 3:
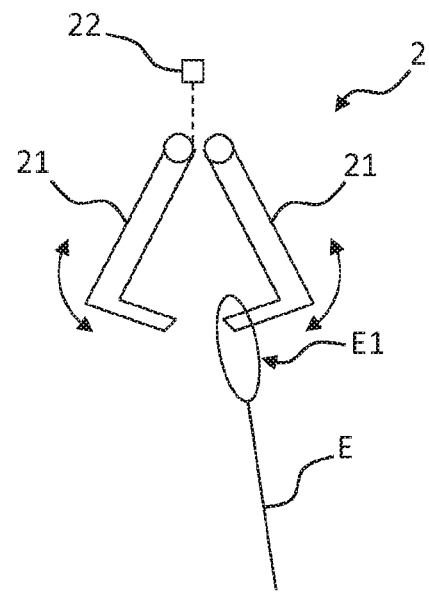
FIG. 3 is a schematic view of a fastening device mounted on the helicopter of FIG. 2.

With reference to FIGS. 2 and 3, the fastening device 2 is in the form of a hook comprising two jaws 21 which are moveable between an open state and a closed state. The moveable jaws 21 are suited, on the one hand, to be moved away from each other in order to release the upper end E1 of the sling E in the open state and, on the other hand, to retain the upper end E1 of the sling E in the closed state. A fastening device 2 has been described being in the form of a hook, however, it goes without saying that the fastening device 2 could be in any other form suited to fastening the sling E to the helicopter 1.

Still with reference to FIGS. 2 and 3, the fastening device 2 comprises control means 22 configured to control the opening and the closing of the jaws 21. The control means 22 may be mechanical or electrical and are, preferably, activated from the cockpit of the helicopter 1 by an operator.

As described previously, the load C may comprise the material to displace and/or human operators. Also, it is important to limit, or even to eliminate, the risk that the load C is dropped in an accidental manner from the helicopter 1 during transport. To this end, the helicopter 1 is equipped with a securing device 3 according to the invention for retaining the sling E in the event of accidental opening of the fastening device 2.

Figure 4:
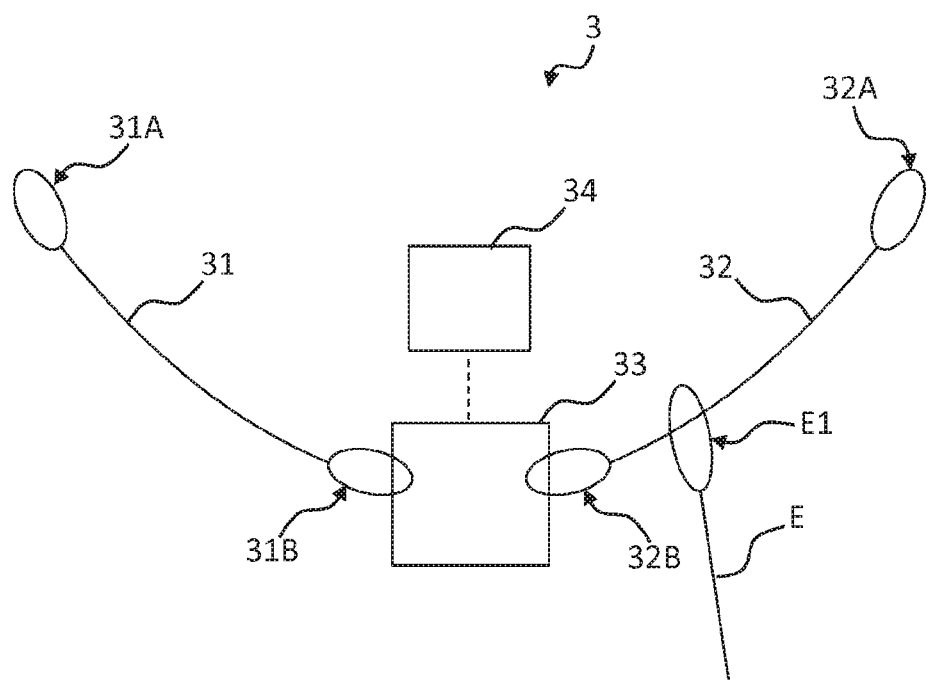
FIG. 4 is a schematic view of a first embodiment of a securing device according to the invention mounted on the helicopter of FIG. 2,
FIGS. 5 to 7 are schematic views of different steps of opening the securing device.

With reference to FIG. 4, the securing device 3 comprises a first strap 31, a second strap 32, a mechanism for connecting 33 the straps 31, 32 and an actuator 34 suited to controlling the opening of the connecting mechanism 33. The first strap 31 extends longitudinally and comprises a joining end 31A suited to being fastened to the helicopter 1 and a connecting end 31B. In an analogous manner, the second strap 32 extends longitudinally and comprises a joining end 32A suited to being fastened to the helicopter 1 and a connecting end 32B. Each strap 31, 32 is flexible and is made, preferably, of textile material. Each strap has a width comprised between 2 and 8 cm, preferably, of the order of 5 cm.

The connecting mechanism 33 makes it possible to connect the connecting ends 31B, 32B of the straps 31, 32 so as to form an overall securing strap. In use, the overall securing strap extends through the loop of the upper end E1 of the sling E. The connecting mechanism 33 enables a reversible linkage of the sling E in order to make it possible to fasten once again the sling E with a view to another transport of a load C. In the closed state, the overall securing strap has a length comprised between 50 cm and 500 cm, preferably, between 60 cm and 130 cm.

When the load C is dropped, the connecting mechanism 33 must be opened. The tension in the connecting mechanism 33 drives a force resisting its opening. Also, to enable easy opening, the connecting mechanism 33 comprises means for reducing the force resisting the opening of the connecting mechanism 33 generated by the support of the sling E and the load C. This thus makes it possible to limit the input force that an operator has to provide on the actuator 34 to release the load C while opposing the force resisting the opening.

Figure 5:
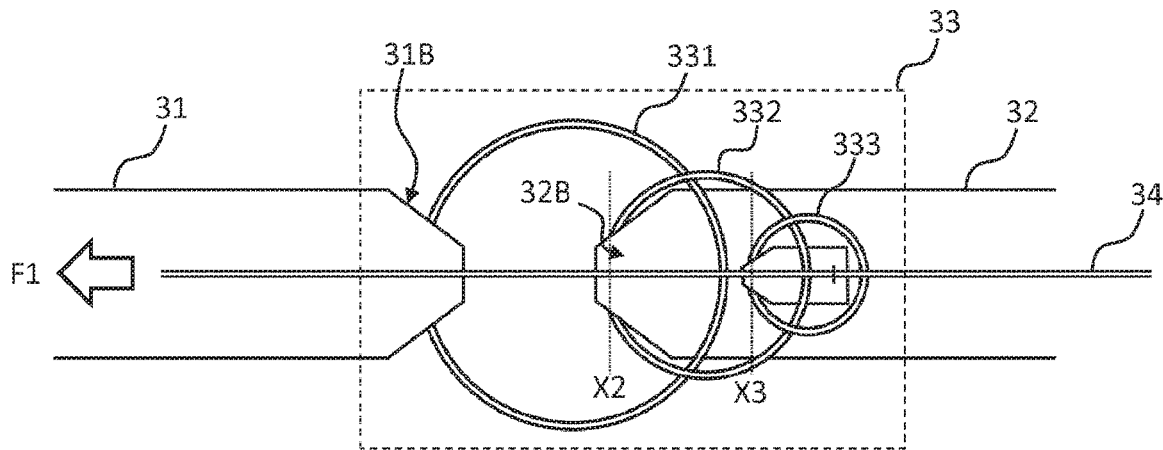
Figure 6:
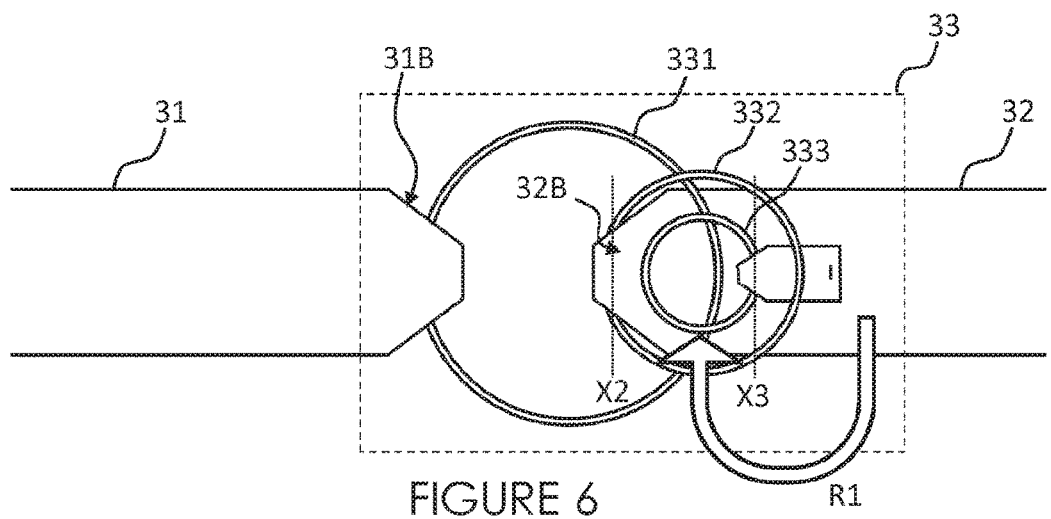
Figure 7:
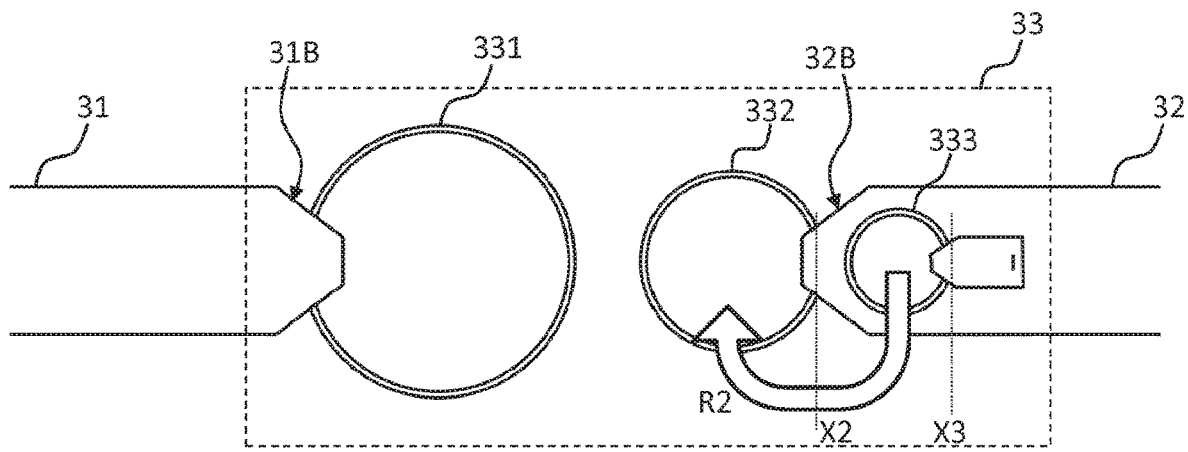

With reference to FIGS. 5 to 7, the reduction connecting mechanism 33 comprises a first ring 331, a second ring 332 and a third ring 333. The rings 331, 332, 333 have a high mechanical strength so as to support a load C of which the mass is high, notably greater than 1.5 tonnes. The first ring 331 has a diameter greater than that of the second ring 332. The second ring 332 has a diameter greater than that of the third ring 333. Further preferably, the first ring 331 has a thickness greater than the other rings 332, 333 given that the first ring 331 must be dimensioned to support a very considerable tractive force.

As illustrated in FIG. 5, the first ring 331 is fastened to the connecting end 31B of the first strap 31 whereas the second ring 332 and the third ring 333 are fastened to the connecting end 32B of the second strap 32. The second ring 332 and the third ring 333 are hinged on the second strap 32 so as to switch between a blocked position and a released position. The rings 332, 333 are respectively hinged along the axes X2, X3 which extend orthogonally to the axis along which extends the second strap 32.

With reference to FIG. 5, when the connecting mechanism 33 is closed, the second ring 332 is turned down in blocked position onto the first ring 331 so as to press it against the second strap 32. Similarly, the third ring 333 is folded back in blocked position on the second ring 332 so as to press it against the second strap 32.

The actuator 34 blocks the third ring 333 in blocked position in order to maintain it pressed against the second strap 32. In this example, the actuator 34 is in the form of a rigid cable which is shown sliding along the axis of the second strap 32 in order to block the third ring 333. The actuator 34 comprises at its end a handle which can be pulled manually by an operator in order to displace the cable and release the third ring 333. The cascade mounting of the rings 331-333 makes it possible to block a ring by a ring of smaller size which requires less force to be displaced. Advantageously, the dimension and the number of rings may be adapted in order to obtain a suitable reduction of the force resisting the opening of the connecting mechanism 33 generated by the load C connected to the sling E.

In an incidental manner, a ring system is known from the field of parachuting that can support a load of 200 kg and which is not suited to supporting a mass greater than 1 tonne.

With reference to FIG. 5, to open the connecting mechanism 33 in the presence of a load C, the operator displaces the actuator 34 while exerting a tractive force Fl and releases the third ring 333. Due to the weight of the load C, the second ring 332 is driven by the first ring 331 joined with the first strap 31. The result is a rotational movement RI of the third ring 333 around the axis X3 (FIG. 6) then a rotational movement R2 of the second ring 332 around the axis X2 (FIG. 7) in order to release the first ring 331 and to enable an effective disconnection. In other words, a cascade sequencing of the movements of the rings 333, 332, 331 ensues to disconnect in a progressive manner the two straps 31, 32.

According to a preferred aspect, the securing device 3 may comprise a sheath (not represented) to protect the straps 31, 32 and to limit the risk of damage.

In use, the securing device 3 is mounted under a helicopter 1. Advantageously, the cable of the actuator 34 is placed under the straps 31, 32 to avoid being jammed by the sling E suspended from the straps 31, 32. In other words, the cable of the actuator 34 and the rings 331-3331 are oriented downwards so that the sling E is uniquely in contact with the upper surface of the straps 31, 32. In addition, the sling E is placed on the side of the second strap 32 to which are fastened the rings 332, 333 of which the dimensions are less than those of the ring 331 fastened to the first strap 31, which makes it possible to limit the risk of blockage of a ring in the loop of the upper end E1 of the sling E during the dropping of the sling E.

The securing device 3 is suited to securing, via a sling E, a load C of which the mass is high, preferably greater than 1500 kg. To open the connecting mechanism 33, the operator exerts a tractive force of the order of 15 kg at the level of the actuator 34. Also, the connecting mechanism 33 has a reduction factor greater than 70, preferably, greater than 100 for a load of 1500 kg. Preferably, the securing device 3 can support a load C up to 6 tonnes.

A method for putting the securing device 3 in place on a helicopter 1 in order to secure a sling E connected to a fastening device 2 will now be described.

Figure 8:
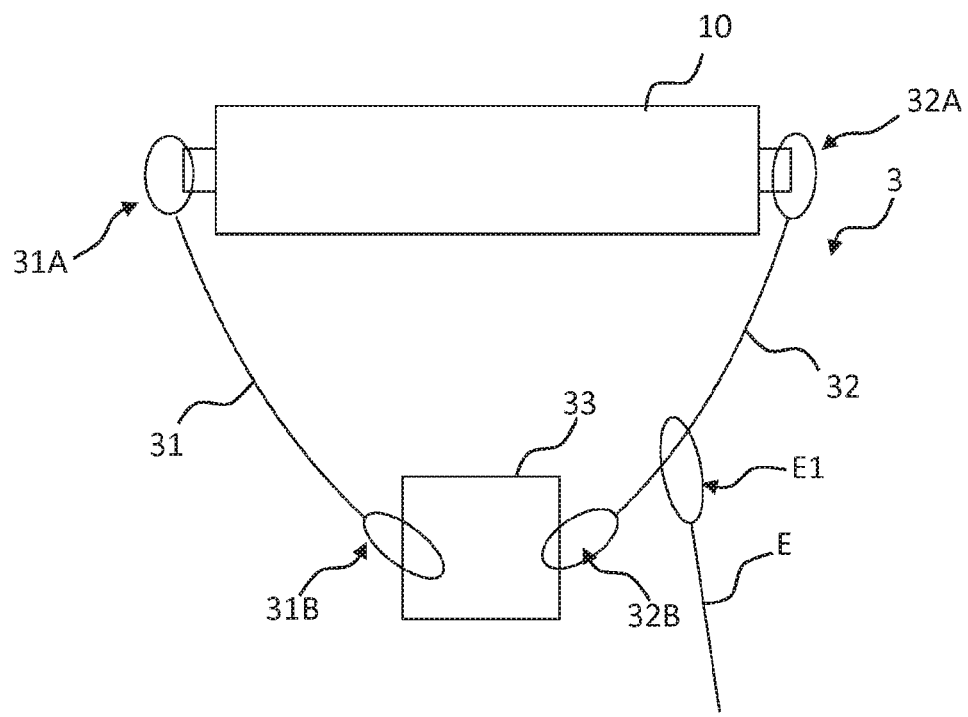
FIG. 8 is a schematic view of a first embodiment of fastening the securing device to a helicopter.

With reference to FIG. 8, to connect the securing device 3 to a helicopter 1, the ends for joining 31A, 32A the straps 31, 32 are directly connected to the structural chassis 10 of the helicopter 1, for example by screwing or by means of hooks. Thus, the forces received by the securing device 3 are transmitted to the structural chassis 10.

Figure 9:
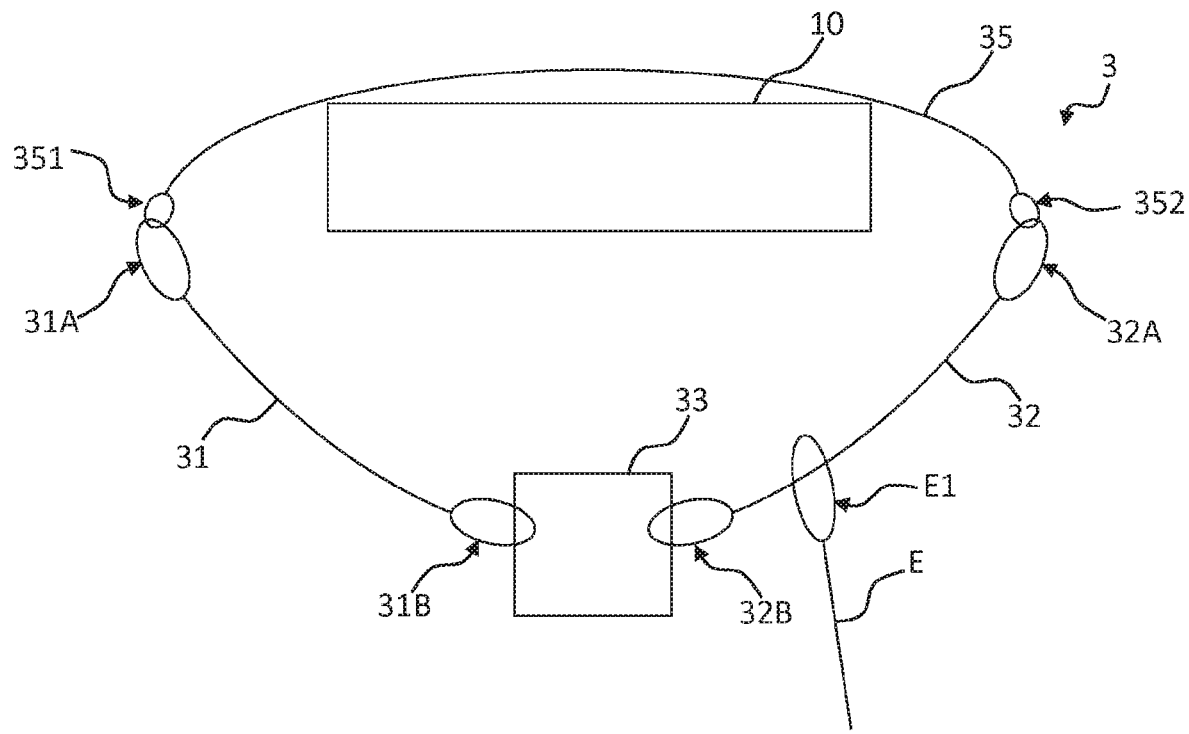
FIG. 9 is a schematic view of a second embodiment of securing the securing device to a helicopter.

Alternatively, with reference to FIG. 9, the securing device 3 may be suspended from the structural chassis 10. To this end, the securing device 3 comprises a third strap 35 extending longitudinally and comprising two mounting ends 351,352. Each mounting end 351,352 is suited to being fastened to one end for joining 31A, 32A the straps 31, 32. Thus, the securing device 3 is in the form of a loop which may be suspended from a part of the chassis 10 of the helicopter 1. The third strap 35 thereby makes it possible to mount the securing device 3 easily on a helicopter 1 not having means dedicated to the fastening of the ends for joining 31A, 32A the straps 31, 32. Such a third strap 35 is particularly suited to putting the securing device 3 in place on an existing helicopter 1.

To support the sling E, the loop formed at the first end E1 of the sling E is mounted in the fastening device 2 which is next closed. Then, the connecting ends 31B, 32B of the securing device 3 are next connected by the connecting mechanism 33 in order to form an overall securing strap extending into the loop formed at the first end E1 of the sling E. Thus, the sling E is retained by the fastening device 2 and secured by the securing device 3, which is loose.

Figure 10:
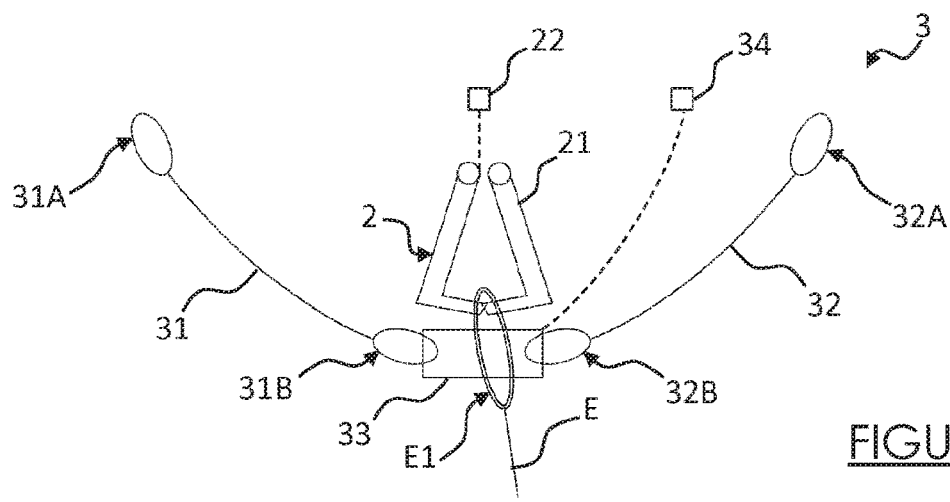
FIGS. 10 to 12 are schematic views of different scenarios of using the securing device.
Figure 11:
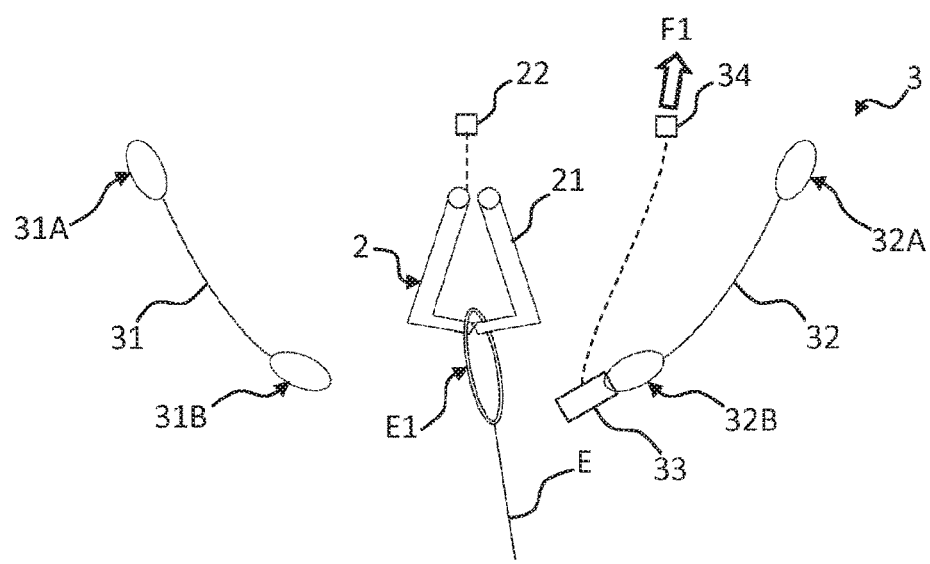
Figure 12:
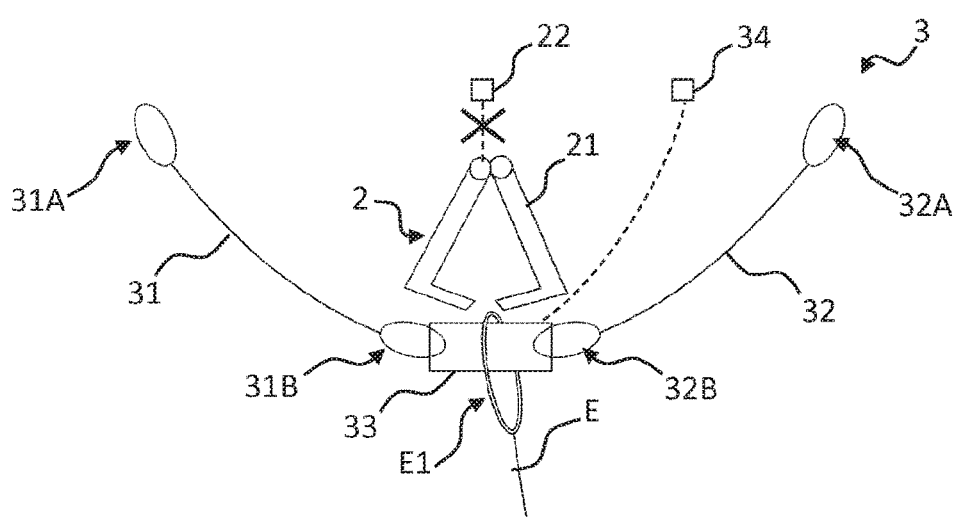

With reference to FIGS. 10 to 12, several scenarios for dropping a load C connected to the helicopter 1 by a sling E will now be described. In this example, the load C has a mass of around 1500 kg.

With reference to FIG. 10, during transport of the load C, the fastening device 2 and the securing device 3 are in the closed state so as to secure the fastening of the sling E to the helicopter 1.

According to a first scenario, with reference to FIG. 11, in order to drop the load C, an operator firstly pulls the actuator 34 from the cockpit of the helicopter 1 to open the connecting mechanism 33 of the securing device 3. The force F1 to provide by the operator is reduced given that the load C remains supported by the fastening device 2. The operator can next actuate the control means 22 to open the jaws 21 of the fastening device 2 in order to drop the load C. In other words, the securing device 3 is disarmed in a preliminary manner in order to be able to drop the load C in a traditional manner following two independent actions of one or more operators.

According to a second scenario, with reference to FIG. 12, following a malfunction of the fastening device 2, the jaws 21 open without action of the operator on the control means 22. The securing device 3 remains in the closed state and retains the sling E. Thus, in the event of accidental opening of the fastening device 2, the sling E is retained by the securing device 3.

The load C is then supported by the securing device 3. Also, the operator exerts a tractive force F1 on the actuator 34 greater than 1 kg, preferably, greater than 15 kg and less than 20 kg, to drop the load C of 1500 kg. The force resisting the opening generated by the load C is reduced by the rings 331-333 in order to make it possible to disconnect the straps 31, 32 in a progressive manner. Thanks to the reduction factor of the connecting mechanism 33, a load C of important mass may be released using reduced human force. In the event of malfunction of the fastening device 2, the load C may be dropped in a practical manner by an operator.

Advantageously, the connecting ends 31B, 32B of the straps 31, 32 may be connected together once again in order to reuse the securing device 3 thereafter for securing another load C. It suffices for an operator to position the rings 331-333 5 with respect to each other in order to block the first ring 331 and the second ring 332. Then, it suffices for the operator to put in place the actuator 34 to block the third ring 333.

In addition, since the securing device 3 is mechanical, no structural modification 10 is necessary for its mounting in a helicopter. The securing device 3 may thus be deployed in any existing helicopter in a practical, rapid manner and at reduced cost. In addition, a mechanical device makes it possible to avoid any electromagnetic disturbance.

The invention claimed is:

1. A device for securing at least one sling for transporting a load under a helicopter, said securing device comprising:
    at least one first strap and at least one second strap, each strap extending longitudinally and comprising an end for joining to the helicopter and a connecting end,
    a connecting mechanism configured, in a closed state, to connect the connecting ends of the straps to form an overall securing strap capable of supporting a sling and, in an open state, to release the connecting ends of the straps to drop the sling from below the helicopter, the connecting mechanism being suited to withstand in the closed state a tractive force of 1500 kg, and
    an actuator configured to open the connecting mechanism following an input of mechanical force, the connecting mechanism comprising a plurality of rings mounted in cascade configured to reduce the force of resistance to the opening of the connecting mechanism induced by the support of the sling so that the input mechanical force is less than 20 kg for a tractive force of 1500 kg induced by the support of the sling, the connecting mechanism comprises at least a first ring, a second ring and a third ring, the first ring having a diameter greater than that of the second ring and the second ring having a diameter greater than that of the third ring, the first ring being hinged at the level of the connecting end of the first strap whereas the second and third rings are hinged at the level of the connecting end of the second strap.

2. The device according to claim 1, in which the connecting mechanism is configured to withstand a tractive force of at least 5000 kg.

3. The device according to claim 1, in which the connecting mechanism is configured to reduce the force resisting the opening of the connecting mechanism generated by the load connected to the sling by a reduction factor greater than 70, for a load of the order of 1500 kg.

4. The device according to claim 1, in which the actuator is suited to receiving an input of mechanical tractive force by an operator.

5. The device according to one claim 1, in which the input mechanical force is greater than 1 kg for a load of the order of 1500 kg.

6. The device according to claim 1, comprising a third strap suited to being connected to the ends for joining the first and the second strap so as to form a securing loop suited to being suspended from a part of the helicopter.

7. The helicopter comprising a structural chassis, a fastening device, fastened to the structural chassis, configured to support a sling and to release it in a controlled manner, and a securing device according to claim 6, of which the ends for joining the first and second strap are fastened to said structural chassis for securing the support of the sling by the helicopter.

8. A method for securing a sling mounted under a helicopter according to claim 7, the method comprising:
    a step of linking the fastening device to a sling, and
    a step of linking the securing device to the sling so as to secure its support by the helicopter.

9. A securing device for transporting a load under a helicopter, said securing device comprising:
    a first strap having a joining end and a connecting end and a second strap having a joining end and a connecting end, the joining ends of the first and second straps configured to connect to the helicopter and the connecting ends of the first and second straps configured to releasably connect to a connecting mechanism, wherein said connecting mechanism comprises a first ring having a first diameter, a second ring having a second diameter, and a third ring having a third diameter, and wherein the first diameter is larger than the second diameter and the second diameter is larger than the third diameter;

a sling having an upper end connected to the securing device and a lower end for connecting to a load; and an actuator configured to open the connecting mechanism following an input of mechanical force, the actuator being in contact with the first ring and the third ring and having an end for actuating by an operator to manipulate the first ring, the second ring, and the third ring to release the load from the helicopter; and wherein the first ring is hinged at the connecting end of the first strap and the second ring is hinged about a second hinged point and the third ring is hinged about a third hinged point at the connecting end of the second strap.

10. The securing device of claim 9, wherein the actuator comprises a cable and a handle.

11. The securing device of claim 10, wherein the connecting mechanism has a closed state and an open state, and wherein the second ring and the third ring are both rotated about the second hinged point and the third hinged point, respectively, and the cable contacts both the third ring and the first ring.

12. The securing device of claim 11, wherein the first strap and the second strap are both made of textile material.

13. The securing device of claim 12, wherein the third ring is configured to rotate about the third hinged point before the second ring rotates about the third hinged point when transitioning from the closed state to the open state.

14. The securing device of claim 9, wherein joining ends of the first and second straps are configured to connect directly to the helicopter or a third strap.

15. The securing device of claim 9, wherein the sling is connected to a fastening device comprising a pivotable jaw.

16. The securing device of claim 9, wherein the second ring is located closer to an end-most point of the second strap than the first ring.

17. A method of transporting a load under a helicopter using a securing device, said method comprising:

linking the fastening device to a sling to support the sling by the helicopter, the sling having an upper end connected to the securing device and a lower end for connecting to a load;

wherein the securing device comprising:

a first strap having a joining end and a connecting end and a second strap having a joining end and a connecting end, the joining ends of the first and second straps configured to connect to the helicopter and the connecting ends of the first and second straps configured to releasably connect to a connecting mechanism, wherein said connecting mechanism comprises a first ring having a first diameter, a second ring having a second diameter, and a third ring having a third diameter, and wherein the first diameter is larger than the second diameter and the second diameter is larger than the third diameter;

an actuator configured to open the connecting mechanism following an input of mechanical force, the actuator being in contact with the first ring and the third ring and having an end for actuating by an operator to manipulate the first ring, the second ring, and the third ring to release the load from the helicopter; and wherein the first ring is hinged at the connecting end of the first strap and the second ring is hinged about a second hinged point and the third ring is hinged about a third hinged point at the connecting end of the second strap.

18. The method of claim 17, further comprising pulling a handle on the actuator to allow the third ring to rotate about the third hinged point.

* * * * *